Nov. 3, 1931.  Y. MERCIER  1,830,615
ELECTRIC ARC TREATMENT OF LIQUID HYDROCARBONS
Filed April 15, 1929
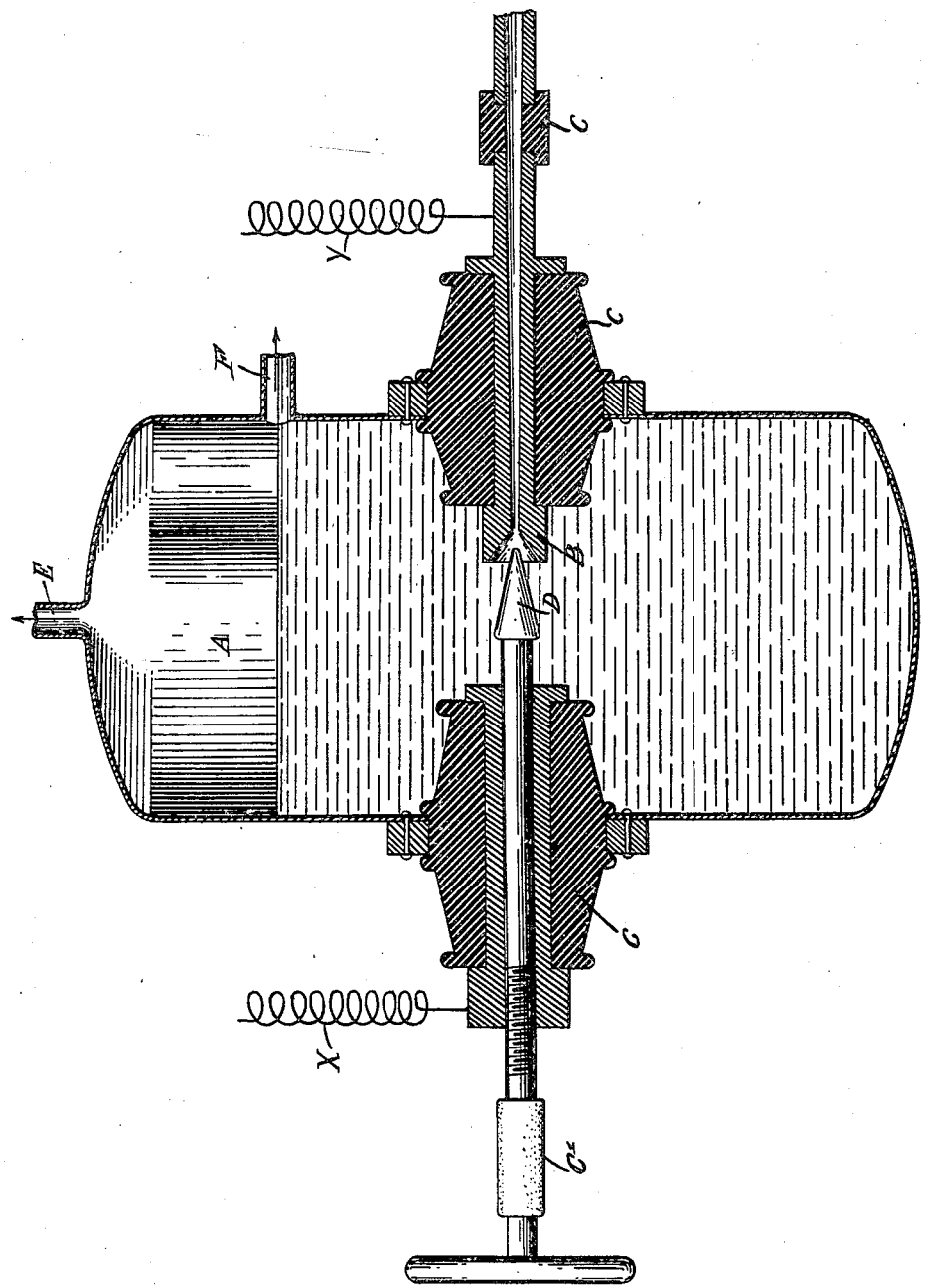
Yves Mercier Inventor
By [signature] Attorneys Patented Nov. 3, 1931                                                    1,830,615

UNITED STATES PATENT OFFICE

YVES MERCIER, OF PARIS, FRANCE, ASSIGNOR TO L'AIR LIQUIDE, SOCIETE ANONYME POUR L'ETUDE & L'EXPLOITATION DES PROCEDES GEORGES CLAUDE, OF PARIS, FRANCE

ELECTRIC ARC TREATMENT OF LIQUID HYDROCARBONS

Application filed April 15, 1929, Serial No. 355,381, and in Great Britain April 20, 1928.

My invention relates to improvements in electric arc treatment of liquid hydrocarbons such as petroleum oils, coal-tar oils, etc. for producing gas containing chiefly hydrogen and acetylene.

It is known that by causing a spark to pass within a liquid hydrocarbon there is obtained, besides carbon, a gas largely composed of hydrogen and acetylene. The acetylene grade or contents of the mixture is under 15%, this approximate figure being given by Berthelot as the equilibrium percentage.

Through the improvements which are the subject matter of this application I am enabled to increase said percentage by moving the reaction towards acetylene formation and to bring up to a maximum the gaseous delivery per kilowatt-hour of energy expenditure.

Various factors influence the yield or efficiency of the operation, to wit: nature of the oil treated, frequency of the current used, capacity and self induction of the electric circuit, nature of electrodes, etc.

According to my invention, I have found that the prime factors are: speed at which the liquid passes through the arc, pressure in the reaction chamber, and spacing of the electrodes for a given voltage.

In order to obtain a high acetylene grade (35%) the gas produced in the arc has to be cooled as rapidly as possible.

A low pressure also fosters actylene formation and operating under at least 15 cm. mercurial depression increases the efficiency.

On the other hand, to obtain a gaseous output as high as possible per kilowatt-hour, one must work with the maximum electrode spacing consistent with steadiness of the arc for a given voltage. There is occasion, however, in such conditions to provide a device permitting of the arc being readily started. For instance, the arc will be started while the two electrodes are in contact, and a device of any suitable kind will be adapted to permit the electrodes to be spaced, once the arc is on, so as to be positioned for best fulfilling the above indicated conditions. Another arc-starting method consists in jumping between the electrodes a high frequency spark which will make a path through the liquid for the normal arc. Said spark may either be kept on during the treatment or be used only while starting operation.

The figure in the accompanying drawing illustrates diagrammatically and as an example an embodiment of my invention.

According to said drawing, the oil to be treated is fed to a container A through the center of a stationary hollow electrode B mounted on the wall of A with a suitable insulator C interposed. Electrode B has its end preferably funnel-shaped in order to permit spreading the arc jumping between it and a removable electrode D, suitably insulated, the end of which is cone-shaped in order to avoid any eventual deposit of carbon thereon, which would short-circuit the arc. The oil, driven by a pump, circulates between electrodes B and D at any desired speed; carried along by the oil the gases formed bubble to the upper regions of container A where they meet an important mass of oil that cools them off. They are then sucked up at E by a vacuum pump while the oil comes out through F to be returned to the oil pump.

Removable electrode D is adjustably maintained at a distance from the electrode B by means, of a threaded rod fitted with an operating hand wheel electrically insulated at C'.

Adjustment of the electrode spacing may, indeed, be effected automatically by means of a suitable mechanism similar to that used with various electric furnaces.

For starting the arc, an auxiliary electric circuit may, for instance, be temporarily shunted on the two current leaders-in to electrodes X and Y.

It should be noted also that both electrodes can be hollow, each thereof serving them to bring the liquid to be treated.

Lastly, by providing a plurality of electrodes, I can get a polyphase arc, thereby securing the known advantages of such an arc, especially as concerns steadiness. With three electrodes, for instance, set at 120° apart, a three phase arc can be readily obtained.

What I claim is:

1. An apparatus for the treatment of liquid hydrocarbons by means of the electric arc, consisting in the use of two series of electrodes of which at least one series is hollow in order to allow for the supply of hydrocarbon, the end of these hollow electrodes having a conical form spreading around the electrode of opposite polarity, the extremity of last mentioned electrode being conical also.

2. An apparatus for the treatment of liquid hydrocarbons by means of the electric arc, consisting in the use of two series of electrodes of which at least one series is hollow in order to allow for the supply of hydrocarbon, the end of these hollow electrodes having a conical form spreading around the electrode of opposite polarity, the extremity of last mentioned electrode being conical also, and the electrodes being separated from one another to the maximum distance compatible with the stability of the arcs.

3. An apparatus for the treatment of liquid hydrocarbons by means of the electric arc, consisting in the use of two series of electrodes of which at least one series is hollow in order to allow for the supply of hydrocarbon, the end of these hollow electrodes having a conical form spreading around the electrode of opposite polarity, the extremity of last mentioned electrode being conical also, the electrodes being separated from one another to the maximum distance compatible with the stability of the arc, and the velocity of flow of the liquid hydrocarbon supplied by the hollow electrodes being sufficient to avoid the eventual carbon deposit on the electrodes.

In witness whereof I have hereunto set my hand.

YVES MERCIER.